UNITED STATES PATENT OFFICE.

ERNST B. HELLER, OF NEW YORK, N. Y., ASSIGNOR TO BEATRICE CREAMERY COMPANY, OF LINCOLN, NEBRASKA, A CORPORATION OF IOWA.

PROCESS OF PRODUCING RENOVATED AND ARTIFICIAL BUTTER.

1,109,750.   Specification of Letters Patent.   Patented Sept. 8, 1914.

No Drawing.   Application filed March 25, 1912.   Serial No. 686,083.

*To all whom it may concern:*

Be it known that I, ERNST B. HELLER, a subject of the Emperor of Germany, residing at New York, in the county of New York and State of New York, have invented certain new and useful Improvements in Processes of Producing Renovated and Artificial Butter; and I do hereby declare the following to be a full, clear, and exact description of the invention, such as will enable others skilled in the art to which it appertains to make and use the same.

My invention relates to a method of ripening food material especially adapted for the production of renovated butter and of artificial butter, and has for its object to provide a process which will produce such butters of better keeping qualities and flavors, and also more expeditiously than the processes heretofore proposed.

To these ends my invention consists in the novel steps constituting my process more fully hereinafter disclosed and particularly pointed out in the claims.

In carrying out my process in the case of renovated butter, I preferably select a low grade butter, because it is less expensive than the high grades. I next melt the same and wash out the impurities, whereupon the butter is chilled to granulate the same. I also prepare milk for mixing with the granulated butter, by inoculating it with a pure germ culture adapted to impart the desired flavor to the finished butter, and I thoroughly mix the granulated butter obtained as above, with a suitable quantity of this germ laden milk to render the process successful. The exact quantity of milk to be mixed may be varied within wide limits, but I prefer to employ in most cases, a little more than is sufficient to immerse the butter. The mixed butter and germ laden milk is next confined in a chamber from which the air is exhausted to say a pressure of about eight inches of mercury, and subjected to a temperature of about 65° F. for a period of about six hours, or until the flavor is satisfactory. The especial advantages of using a vacuum, as above, reside in the fact that in withdrawing the air from the mixture, the objectionable flavors of the butter are also withdrawn; and further, I have discovered that the beneficial bacteria which impart the desirable flavors, will thrive in a vacuum, while the objectionable or putrefying bacteria will not thrive therein, and therefore, butter renovated by my process not only has a better flavor, but possesses better keeping qualities than butter which has been renovated in the presence of the atmosphere. After the butter has been thus ripened, it is worked and finished like ordinary butter.

In the making of artificial butter, according to my process, I take the raw material used in the manufacture of oleomargarin, make an emulsion of these materials with about ten per cent. to thirty per cent. milk or cream, which has been previously inoculated with the germ cultures above mentioned, place the mixture in a suitable chamber, exhaust the air as above, and then leave the material to ripen for about six hours, or until the desired flavor has been attained. The butter is then churned and worked as usual. The employment of a vacuum in this case possesses the same advantages as in the case of renovating butter above stated. Furthermore, the employment of a vacuum in both cases reduces the ripening period by about fifty per cent.

Very superior results in the case of both renovated or artificial butters can be attained by melting and washing the butter in a vacuum or out of contact with the germ laden air, or pasteurizing the oleomargarin materials in a vacuum, preparing the milk or cream by pasteurizing and inoculating the same in another vacuum preferably located above said first vacuum and having a valved connection therewith, then admitting said milk or cream to said first vacuum chamber and carrying out the ripening, churning and working steps all in said first vacuum chamber. By this last mentioned method, I am enabled to employ lower temperatures, and to absolutely insure against all deleterious germs at all stages of the process, and to make butters of the highest flavors and longest keeping qualities.

It is obvious that those skilled in the art may vary the details of my process without departing from the spirit thereof, and therefore I do not wish to be limited to the above disclosures except as may be required by the claims.

What I claim is:—

1. The process of producing butter, which consists in heating a portion of the material consisting of a fatty substance and a lacteal fluid out of which said butter is to be made in a vacuum chamber; pasteurizing another portion of said material in another vacuum chamber; inoculating said last mentioned portion with flavoring bacteria while maintaining it free from contact with germ laden air; transferring said inoculated portion from said last mentioned chamber into said first chamber while maintaining the same out of contact with the air; mixing said portions; permitting them to ripen; and finally churning and working the butter thus produced, substantially as described.

2. The process of producing butter, which consists in melting the fat containing material; washing the same; chilling and granulating said material; inoculating a lacteal fluid with a flavoring culture; mixing said inoculated fluid with said granulated material; exhausting the air from the chamber containing said mixed materials and allowing them to ripen for a predetermined period in said exhausted chamber; and finally churning and working the butter thus produced, substantially as described.

3. The process of producing renovated butter, which consists in melting butter material *in vacuo;* washing the same to remove impurities; chilling and granulating said washed material *in vacuo;* pasteurizing milk to be mixed with said material *in vacuo;* inoculating said milk with flavoring bacteria while maintaining it free from germ laden air; mixing said butter material and inoculated milk while maintaining all the materials out of contact with the atmosphere; allowing said mixed materials to ripen *in vacuo;* and churning and working the butter thus produced *in vacuo*, substantially as described.

4. The process of producing renovated butter, which consists in melting the butter forming material; washing the same; mixing the washed material with bacteria inoculated milk; exhausting the air from the vessel containing said mixture; permitting said mixture to ripen *in vacuo;* and finally churning and working the butter thus produced *in vacuo*, substantially as described.

In testimony whereof, I affix my signature, in presence of two witnesses.

ERNST B. HELLER.

Witnesses:
T. A. WITHERSPOON,
R. M. PARKER.